United States Patent [19]
Itoh et al.

[11] Patent Number: 5,653,839
[45] Date of Patent: Aug. 5, 1997

[54] FIRE-RESISTANT GLASS AND PROCESS FOR PRODUCTION THEREOF

[75] Inventors: Hiroshi Itoh, Kamakura; Takashi Abe, Yokohama; Hitoshi Yamashita, Kawasaki; Toshihiro Yoshimura, Kamakura; Takeshi Hisanaga, Matsusaka; Takao Takebayashi, Ise; Kunio Nakata, Matsusaka; Chikara Hashimoto, Ohmiya, all of Japan

[73] Assignees: Mitsui Toatsu Chemical Incorporated, Tokyo; Central Glass Company, Limited, Ube, both of Japan

[21] Appl. No.: 415,985

[22] Filed: Apr. 4, 1995

Related U.S. Application Data

[62] Division of Ser. No. 128,709, Sep. 30, 1993, Pat. No. 5,437,902.

[30] Foreign Application Priority Data

Sep. 30, 1992  [JP]  Japan ................... 4-261888

[51] Int. Cl.$^6$ .................................... C03C 27/00
[52] U.S. Cl. .................. 156/109; 156/102; 264/261; 428/34; 428/68; 428/76; 522/84; 522/175
[58] Field of Search .................... 428/34, 76, 68; 524/430; 52/786.11, 786.13, 309.14, 742.13; 156/102, 109; 264/261; 522/84.75

[56] References Cited

U.S. PATENT DOCUMENTS

| | | | |
|---|---|---|---|
| 4,122,046 | 10/1978 | Waldmann | 522/175 |
| 4,718,899 | 1/1988 | Itoh et al. | |
| 4,729,834 | 3/1988 | Itoh et al. | |
| 5,155,191 | 10/1992 | Itoh et al. | |

FOREIGN PATENT DOCUMENTS

| | | | |
|---|---|---|---|
| 1531 | 4/1979 | European Pat. Off. | 156/109 |

*Primary Examiner*—John J. Gallagher
*Attorney, Agent, or Firm*—Oblon, Spivak, McClelland, Maier & Neustaddt, P.C.

[57] ABSTRACT

A fire-resistant glass comprising:

(a) at least two plate-shaped vitreous materials arranged parallel and apart, the sides of the plate-shaped vitreous materials facing each other being treated with a silane coupling agent, (b) a spacer provided between the plate-shaped vitreous materials at their peripheries via an adhesive, (c) a sealing agent adhered to the outer surface of the spacer, and (d) an aqueous gel filled into the space formed by the plate-shaped vitreous materials and the spacer, the aqueous gel comprising a polymer of a particular (meth)acrylamide derivative, a particulate metal oxide, an aqueous medium and an antifreezing agent.

This fire-resistant glass has an excellent fire-resistant property; is stable over a long period of time and is unsusceptible to deterioration.

3 Claims, 2 Drawing Sheets

FIRE-RESISTANT GLASS AND PROCESS FOR PRODUCTION THEREOF

This is a division of application Ser. No. 08/128,709 filed on Sep. 30, 1993, now U.S. Pat. No. 5,437,902.

BACKGROUND OF THE INVENTION a) Field of the Invention

The present invention relates to a fire-resistant glass comprising at least two plate-shaped vitreous materials arranged parallel and apart, a spacer provided between the plate-shaped vitreous materials at their peripheries, and an aqueous gel filled into the space formed by the plate-shaped vitreous materials and the spacer, as well as to a process for production of said fire-resistant glass.

b) Description of the Related Art

A composite material is disclosed in Japanese Patent Publication No. 24063/1985, which material comprises two parallel glass plates and an aqueous gel containing a polymer of an acrylic acid derivative and a soluble and foamable salt (e.g. water-glass), interposed between the glass plates. Since the soluble and foamable salt contained in the gel is strongly alkaline, said composite material needs careful handling; the acrylic acid derivative polymer contained in the gel may undergo easy deterioration; and the gel-supporting material may be corroded depending upon the type. Further, since the soluble and foamable salt generally has a low melting point and insufficient high-temperature stability, the salt is easily melted in contact with flames.

SUMMARY OF THE INVENTION

The present invention is intended to provide a fire-resistant glass which is free from the above problems, which can be used at or around normal temperature stably for a long period of time, and which is applicable as a Koh-grade fire-resistant door (this Koh-grade fire-resistant door is specified by the Ministry of Construction of Japan), and a process for producing said fire-resistant glass.

According to the present invention, there is provided a fire-resistant glass comprising:

(a) at least two plate-shaped vitreous materials arranged parallel and apart, the sides of the plate-shaped vitreous materials facing each other being treated with a silane coupling agent, (b) a spacer provided between the plate-shaped vitreous materials at their peripheries via an adhesive, (c) a sealing agent adhered to the outer surface of the spacer, and (d) an aqueous gel filled into the space formed by the plate-shaped vitreous materials and the spacer, the aqueous gel comprising a polymer of a (meth) acrylamide derivative represented by the following general formula (I) or (II)

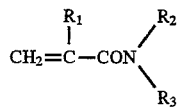

($R_1$ is a hydrogen atom or a methyl group; $R_2$ is a hydrogen atom, a methyl group or an ethyl group; and $R_3$ is an ethyl group or a propyl group)

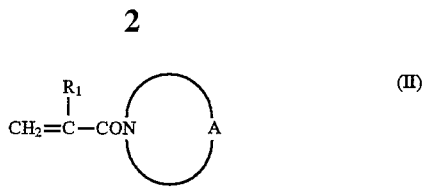

[$R_1$ is a hydrogen atom or a methyl group, and A is —$(CH_2)_n$- ($4 \leq n \leq 6$) or —$(CH_2)_2$—O—$(CH_2)_2$—],
a particulate metal oxide, an aqueous medium and an antifreezing agent.

According to the present invention, there is further provided a process for producing a fire-resistant glass, which comprises arranging at least two plate-shaped vitreous materials parallel and apart, treating the sides of the plate-shaped vitreous materials facing each other, with a silane coupling agent, providing a spacer between the plate-shaped vitreous materials at their peripheries via an adhesive, adhering a sealing agent to the exposed outer surface of the spacer to form an assembly, filling, into the space of the assembly formed by the plate-shaped vitreous materials and the spacer, a composition comprising a (meth)acrylamide derivative represented by the following general formula (I) or (II)

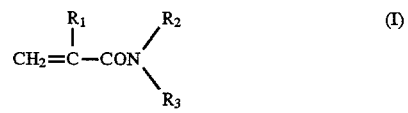

($R_1$ is a hydrogen atom or a methyl group; $R_2$ is a hydrogen atom, a methyl group or an ethyl group; and $R_3$ is an ethyl group or a propyl group)

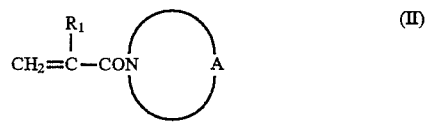

[$R_1$ is a hydrogen atom or a methyl group, and A is —$(CH_2)_n$- ($4 \leq n \leq 6$) or —$(CH_2)_2$—O—$(CH_2)_2$—],
a particulate metal oxide, an aqueous medium and an antifreezing agent, and polymerizing the (meth)acrylamide derivative to convert the composition into an aqueous gel.

The fire-resistant glass according to the present invention has excellent fire-resistant property, is stable over a long period of time, and is unsusceptible to deterioration.

DETAILED DESCRIPTION OF THE INVENTION

Figure 1A:
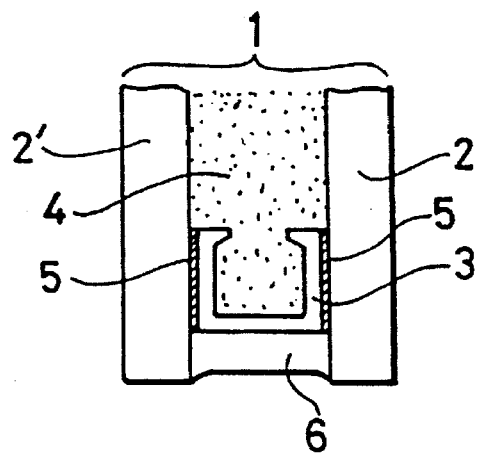
FIGS. 1A to 1F are the fragmentary sectional side views of present fire-resistant glasses using various spacers of different sectional shapes.

The present invention is described in detail below.

In the present invention, the (meth)acrylamide derivative represented by the above general formula (I) or (II) is exemplified by N-ethylacrylamide, N,N-diethylacrylamide, N-ethylmethacrylamide, N-methyl-N-ethylacrylamide, N-methyl-N-ethylmethacrylamide, N-isopropylacrylamide, N-n-propylacrylamide, N-isopropylmethacrylamide, N-n- propylmethacrylamide, N-methyl-N-propylacrylamide, N-acryloylpyrrolidine, N-methacryloylpyrrolidine, N-acryloylpiperidine, N-methacryloylpiperidine, N-acryloylhexahydroazepine, N-acryloylmorpholine and N-methacryloylmorpholine.

Each of these monomers, when made into a polymer or a copolymer, is hydrophilic and transparent at low temperatures to normal temperature. The polymer or copolymer, when heated, turns hydrophobic and whitens. This whitening phenomenon intercepts heat rays and, as a result, can hinder temperature increase. Besides the above monomer which is an essential monomer, there may be as necessary used, in combination, a crosslinkable monomer, a hydrophilic monomer, an ionic monomer and a hydrophobic monomer in order to control the hardness and/or whitening temperature of the resulting aqueous gel.

The crosslinkable monomer includes a monomer having at least two unsaturated bonds in the molecule and a monomer [e.g. N-alkoxymethyl(meth)acrylamide derivative] capable of forming, after polymerization, a crosslinked structure by a post-treatment (e.g. heating).

The former crosslinkable monomer includes, for example, N,N'-methylenebisacrylamide, N,N'-diallylacrylamide, triacrylformal, N,N'-diacryloylimide, N,N'-dimethacryloylimide, ethylene glycol acrylate, ethylene glycol dimethacrylate, polyethylene glycol dimethacrylates, propylene glycol diacrylate, propylene glycol dimethacrylates, polypropylene glycol diacrylates, polypropylene glycol dimethacrylates, 1,3-butylene glycol diacrylate, 1,3-butylene glycol dimethacrylate, 1,4-butylene glycol dimethacrylate, glycerol dimethacrylate, neobenzyl glycol dimethacrylate, trimethylolpropane triacrylate, trimethyiolpropane trimethacrylate, trimethylolethane triacrylate, tetramethylolmethane tetraacrylate, tetramethylolmethane triacrylate, divinylbenzene, diallyl phthalate, uretahne (meth)acrylate, polyester (meth)acrylate and epoxy acrylate.

The latter monomer, i.e. N-alkoxymethyl(meth)acrylamide derivative includes, for example, N-hydroxymethyl(meth)acrylamide, N-methylol(meth)acrylamide, N-methoxymethyl(meth)acrylamide and N-tert-butoxymethyl(meth)acrylamide.

The hydrophilic monomer includes, for example, acrylamide, methacrylamide, N-methylacrylamide, N-methylmethacrylamide, N,N-dimethylacrylamide, N,N-dimethylmethacrylamide, diacetoneacrylamide, hydroxyethyl methacrylate, hydroxyethyl acrylate, hydroxypropyl methacrylate, hydroxypropyl acrylate, methoxypolyethylene glycol (meth)acrylates and N-vinyl-2-pyrrolidone. It is possible to use vinyl acetate, glycidyl methacrylate or the like as a copolymerizable monomer and hydrolyze the resulting copolymer to impart hydrophilicity.

The ionic monomer includes, for example, acids such as acrylic acid, methacrylic acid, itaconic acid, vinylsulfonic acid, allylsulfonic acid, methallylsulfonic acid, styrenesulfonic acid, 2-acrylamide-2-phenylpropanesulfonic acid, 2-acrylamide-2-methylpropanesulfonic acid, (meth)acrylate of ethylene oxide-modified phosphoric acid and the like, and salts thereof; and amines such as N,N-dimethylaminoethyl methacrylate, N,N-diethylaminoethyl methacrylate, N,N-dimethylaminoethyl acrylate, N,N-dimethylaminopropylmethacrylamide, N,N-dimethylaminopropylacrylamide and the like, and salts thereof. It is possible to use an acrylate, a methacrylate, acrylamide, methacrylamide, acrylonitrile or the like as a copolymerizable monomer and hydrolyze the resulting copolymer to impart ionicity.

The hydrophobic monomer includes, for example, N-alkyl(meth)acrylamide derivatives such as N,N-di-n-propylacrylamide, N-n-butylacrylamide, N-tert-butylacrylamide, N-n-hexylacrylamide, N-n-hexylmethacrylamide, N-n-octylacrylamide, N-n-octylmethacrylamide, N-tert-octylacrylamide, N-n-dodecylacrylamide, N-n-dodecylmethacrylamide and the like; N-(ω-glycidoxyalkyl)(meth)acrylamide derivatives such as N,N-diglycidylacrylamide, N,N-diglycidylmethacrylamide, N-(4-glycidoxybutyl)acrylamide, N-(4-glycidoxybutyl)methacrylamide, N-(5-glycidoxypentyl)acrylamide, N-(6-glycidoxy-hexyl)acrylamide and the like; (meth)acrylate derivatives such as ethyl acrylate, methyl methacrylate, butyl methacrylate, butyl acrylate, lauryl acrylate, 2-ethylhexyl methacrylate, glycidyl methacrylate and the like; acrylonitrile; methacrylonitrile; vinyl acetate; vinyl chloride; vinylidene chloride; olefins such as ethylene, propylene, butene and the like; styrene; divinylbenzene; α-methylstyrene, butadiene; and isoprene.

The amount ratio of the (meth)acrylamide derivative and the above-mentioned monomers varies depending upon the combination of the monomers selected. In general, the amount of the crosslinkable monomer is 5% by weight or less, preferably 3% by weight or less of the total amount of the monomers. The presence of the crosslinkable monomer in excess allows the resulting aqueous gel to be harder but fragile. The amounts of the hydrophilic monomer and the ionic monomer are each 80% by weight or less, preferably 70% by weight or less of the total amount of the monomers. Their presence in excess allows the resulting aqueous gel to have a higher whitening temperature, making the occurrence of whitening difficult. The amount of the hydrophobic monomer is 20% by weight or less, preferably 10% by weight or less of the total amount of the monomers. Its presence in excess impairs the transparency of the resulting aqueous gel.

As the particulate metal oxide which is other essential component constituting the material composition for aqueous gel, various metal oxides can be used as long as they are insoluble in water. They are exemplified by silicon dioxide, aluminum oxide, antimony oxide, titanium oxide, tin oxide, zirconium oxide, lead oxide, calcium oxide, magnesium oxide and their compound oxides. Of these, preferable are silicon dioxide, aluminum oxide, antimony oxide and compound oxides thereof.

The particulate metal oxide is effective in that it is not melted and remains in a porous state even after the resulting aqueous gel is attacked by flames and the water and organic materials in the gel are vaporized and that the porous structure prevents spreading of flames therethrough and serves for heat insulation.

In producing silicon dioxide, there can be employed a dry process which comprises pyrolysis of silicon tetrachloride; a wet process which comprises precipitation by double decomposition of sodium silicate with an acid, carbon dioxide, an ammonium salt or the like; and an aerogel process which comprises heating an organic liquid (e.g. alcohol) and silica gel in an autoclave. When silicon dioxide is used as a particulate metal oxide, it can be used as an aqueous suspension or as a dry powder.

In producing aluminum oxide, there can be used various processes such as heating and dehydration of hydroxide, reaction of sodium aluminate with carbon dioxide or sulfur dioxide, addition of alkaline substance to aqueous aluminum salt solution and dehydration of the resulting alumina hydrate, high-temperature burning of aluminum salt, hydrolysis of aluminum alkoxide, and hydrolysis of alkylaluminum. Any of the aluminum oxides produced by these processes can be used as a particulate metal oxide.

As antimony oxide, diantimony trioxide is preferred. In production thereof, there can be used, for example, a process wherein air is blown into molten antimonite or molten metallic antimony, and a process wherein antimonite is burnt and the evaporated diantimony trioxide is quenched to obtain diantimony trioxide in a fine powder state.

As the compound oxide, there can be used, for example, aluminum silicate. It can be obtained by reacting an aqueous sodium silicate solution with an aqueous aluminum salt solution.

The above-mentioned particulate metal oxides can be used singly or in combination of two or more. The particle diameters of the particulate metal oxide is 0.5 μm or less, preferably 0.1 μm or less in order to allow the resulting aqueous gel to have transparency. The particle diameters smaller than 0.001 μm (1 nm) are not required because the transparency shows no improvement any more and remains same at such a small diameter.

In the suspension of a particulate metal oxide, there is generally an inconvenience that a small particle diameter can achieve transparency but gives translucent whiteness. In the present invention, however, by using a particulate metal oxide in combination with a particular (meth)acrylamide derivative, transparency with reduced translucent whiteness can be obtained.

The medium used in the material composition for aqueous gel is water. Preferable as the water are ion-exchanged water, distilled water, underground water, tap water, industrial water, etc. An antifreezing agent for water, miscible therewith is also required. The agent includes a lower alcohol, a glycol, a ketone, an amide, a saccharide, urea, etc. The antifreezing agent prevents the freezing of the medium at very low temperatures and imparts increased weather resistance.

As the alcohol, there can be mentioned methyl alcohol, ethyl alcohol, propyl alcohol, etc. As the glycol, there can be mentioned ethylene glycol, propylene glycol, glycerine, diethylene glycol, dipropylene glycol, polyethylene glycol, polypropylene glycol, polyglycerine, copolymers thereof, etc. As the ketone, there can be mentioned acetone, methyl ethyl ketone, etc. As the amide, there can be mentioned formamide, N,N-dimethylformamide, N,N-dimethylacetamide, etc. As the saccharide, there can be mentioned monosaccharides such as glyceraldehyde, erythritol, xylose, ribose, arabitose, galactose, glucose, sorbose, mannose and the like; disaccharides such as saccharose, maltose, lactose and the like; and polysaccharides such as cyclodextrin, raffinose, agarose, glycogen, dextran and the like. The proportion of the antifreezing agent in the aqueous medium and the antifreezing agent is 60% by weight or less, preferably 50–5% by weight. When the amount of the antifreezing agent is too large, that is, the amount of water is too small, gelation is impaired. When the amount of the antifreezing agent is too small, the resulting aqueous gel is easily frozen at low temperatures and has insufficient weather resistance.

In the material composition for aqueous gel, the proportion of the particular (meth)acrylamide derivative is 2–35% by weight, preferably 3–30% by weight; the proportion of the particulate metal oxide is 4–40% by weight, preferably 8–35% by weight; and the remainder is the aqueous medium. When each component of the material composition for aqueous gel is in the above range, an aqueous gel of excellent fire-resistant property can be obtained which has sufficient transparency at normal temperature, which has good weather resistance, and which can prevent spreading-through of flames and maintain heat insulation when attacked by flames of high temperatures.

The material composition for aqueous gel may further comprise a surfactant for stable dispersion of the particulate metal oxide. The surfactant can be appropriately selected from those of anionic type, nonionic type, cationic type and amphoteric type.

The production of an aqueous gel can be conducted by polymerizing a particular (meth)acrylamide derivative in the presence of a suspended particulate metal oxide or by mixing a polymer of said (meth)acrylamide derivative with a suspension of a particulate metal oxide. The former method is advantageous because it can be conducted easily with the particulate metal oxide being uniformly suspended.

The production of an aqueous gel is preferably conducted in a state that, as described later, a material composition for aqueous gel is filled in an assembly comprising a pair of glass plates arranged parallel and apart and a spacer provided between the glass plates at their peripheries. In this state, a particular (meth)acrylamide derivative in the material composition is polymerized to obtain an aqueous gel comprising a polymer of said (meth)acrylamide derivative, a particulate metal oxide, etc.

This polymerization may be conducted in the presence of a polymerization initiator such as an inorganic peroxide, an organic peroxide, e combination of said peroxide with a reducing agent, an azo compound or the like, but is preferably conducted by photopolymerization. The photopolymerization includes, for example, a method using ultraviolet rays and a method using ultraviolet rays in the presence of a polymerization initiator. A method using ultraviolet rays in the presence of a photopolymerization initiator is particularly preferable.

The photopolymerization initiator has no particular restriction. Specific examples thereof are dimethylaminobenzoic acid and alkyl ester derivatives thereof (e.g. methyl dimethylaminobenzoate); acetophenone derivatives (e.g. 2,2-diethoxyacetophenone); ketal derivatives (e.g. benzenedimethylketal) and acetal derivatives; diazide derivatives (e.g. N,N-diazidostilbene-2,2'-disulfonic acid); pyrene derivatives (e.g. 3,3 -dimethyl-4-methoxybenzophenoneazidpyrene); naphthoquinone (1,2) diazide (2) derivatives (e.g. sodium naphthoquinone (1,2) diazido (2)-4-sulfonate); triphenylpyridium perchlorate and derivatives thereof; benzophenone derivatives (e.g. 4,4'-bisdimethylaminobenzophenone); benzil; benzoin and alkyl ether derivatives thereof; 2-hydroxy-2-methyl-propiophenone and derivatives thereof (e.g. 2,4-diethylthioxanthone); azido-substituted derivatives (e.g. p-azidobenzoic acid); thioxanthone and derivatives thereof (e.g. 2,4-diethylthioxanthone); dibenzosuberone; 5-nitroacenaphthene; and 1-hydroxycyclohexyl phenyl ketone. These photopolymerization initiators may be used singly or in combination of two or more. They may be used in combination with a photosensitizer, for example, an amine derivative such as aromatic amine, aliphatic amine, isoamyl p-dimethylaminobenzoate or the like, for acceleration of curing rate.

The photopolymerization initiator is effective when used in an amount of ordinarily 0.07% by weight or more, preferably 0.1% by weight or more based on the particular (meth)acrylamide derivative. The use of the photopolymerization initiator in an amount of 10% by weight or more is unnecessary.

When the material composition for aqueous gel is formulated as above, the resulting aqueous gel is stable over a long period of time at normal temperature and, when attacked by flames, exhibits excellent fire-resistant property.

When the aqueous gel is enclosed in a fire-resistant glass and the glass is used outdoor as a see through window, a front door, etc. of a building, the glass preferably has a seeing-through property up to a temperature as high as possible. For this purpose, the aqueous gel preferably has a whitening temperature of 50°–110° C. This whitening temperature range of the aqueous gel can be achieved by appropriately combining a particular (meth)acrylamide derivative, a hydrophilic monomer, an ionic monomer and a hydrophobic monomer as mentioned Above.

The fire-resistant glass of the present invention has a structure comprising:

(a) at least two plate-shaped vitreous materials arranged parallel and apart, the sides of the plate-shaped vitreous materials facing each other being treated with a silane coupling agent, (b) a spacer provided between the plate-shaped vitreous materials at their peripheries via a tacky and water-non-permeable adhesive, (c) a sealing agent adhered onto the outer surface of the spacer, and (d) an aqueous gel filled into the space formed by the plate-shaped vitreous materials and the spacer.

(Each plate-shaped vitreous material may be an organic glass of polycarbonate type, (meth)acrylic resin type or the like, but is preferably an inorganic glass in view of the fire-resistant property.) The inorganic glass includes transparent colored or uncolored glasses (e.g. soda-lime glass, borosilicate glass, aluminosilicate glass); tempered, semi-tempered or partially tempered glasses thereof; wire glasses; laminated glasses; crystallized glasses; glasses having, on the surface, functional films (e.g. heat-rays-reflecting film); combinations of said glasses. The shape of the plate-shaped vitreous material is not restricted and its thickness is appropriately selected in the range of, for example, 1 millimeter to several tens of millimeters. The plate-shaped vitreous material may be a bent glass or the like.

The plate-shaped vitreous material is used in two or more layers. The gap between two adjacent layers is several millimeters to several tens of millimeters and is appropriately selected, for example, between 3 mm and 60 mm. The above-mentioned aqueous gel composition is filled between the layers. This assembly may be used in combination with a multiple glass comprising two glasses and a gas filled in the gap between the two glasses.

The surface sides of the plate-shaped vitreous materials facing each other are preferably treated with a silane coupling agent so that the surface sides have improved adhesion to an aqueous gel with which the surface sides come in contact later. The silane coupling agent includes vinyltrimethoxysilane, vinyltriethoxysilane, γ-(methacryloxypropyl)trimethoxysilane, γ-glycidoxypropyltrimethoxysilane, γ-glycidoxypropylmethyldiethoxysilane, N-β(aminoethyl)-γ-aminopropyltrimethoxysilane, γ-aminopropyltriethoxysilane, N-phenyl-γ-aminopropyltrimethoxysilane, γ-mercaptopropyltrimethoxysilane, γ-chloropropyltrimethoxysilane, etc. Of these silane coupling agents, preferable are those having unsaturated bond(s) in the molecule, such as vinyltrimethoxysilane, vinyltriethoxysilane, γ-(methacryloxypropyl)trimethoxysilane and the like.

The spacer provided between the plate-shaped vitreous materials for separating them from each other, basically has a sectional shape of ⌴ or ⊓. The sectional shape may be modifications, for example ⊓, ⊔, H and various others mentioned later. The material of the spacer may be any of a metal (e.g. aluminum, lead or steel), a ceramic, a FRP, etc. as long as it can hold an aqueous gel between the plate-shaped vitreous materials and the spacer, at a normal temperature range. However, a metal is preferred in view of the processability, heat stability, etc..

The spacer and the plate-shaped vitreous materials are adhered to each other preferably using a tacky and water-non-permeable adhesive of synthetic rubber type (e.g. polyisobutylene type, polyisobutylene-butyl rubber type or butyl rubber type). The adhesive may contain, as necessary, a reinforcing filler such as silica, white carbon, titanium oxide, magnesium silicate, aluminum silicate or the like; a tackifier such as unsaturated hydrocarbon resin, coumaron resin, terpene resin, rosin derivative or the like; a drying agent; and so forth. The adhesive, owing to the high adhesivity, can support the plate-shaped vitreous materials in a wide temperature range and prevent the leakage of aqueous medium from aqueous gel, even when the plate-shaped vitreous materials are flexed by the change in atmospheric pressure or by the expansion or shrinkage of aqueous gel; thereby, the fire-resistant glass of the present invention is stable over a long period of time. Since the adhesive is an organic material, it loses the functions at abnormally high temperatures, but it can function permanently in a temperature range of –20° C. to 50°–60° C.

After the spacer has been superimposed between the plate-shaped vitreous materials at their peripheries, the outer surface of the spacer is sealed with a sealing agent of similar synthetic rubber type such as silicone type, polysulfide rubber type, polyurethane type, polyisobutylene-polystyrene type or the like. The sealing agent may contain as necessary additives such as filler (e.g. heat-resistant inorganic material powder). The sealing agent has adhesivity as well and is an important constituent for ensuring the tight connection between plate-shaped vitreous materials and spacer and the prevention of leakage of aqueous gel.

FIGS. 1A to 1D are the fragmentary sectional views of present fire-resistant glasses using various spacers of different sectional shapes. In these FIGS., 1 is a fire-resistant glass; 2 and 2' are each a plate-shaped vitreous material; 3 is a spacer; 4 is an aqeuous gel; 5 is a tacky and water-non-permeable adhesive; and 6 is a sealing agent.

Figure 1B:
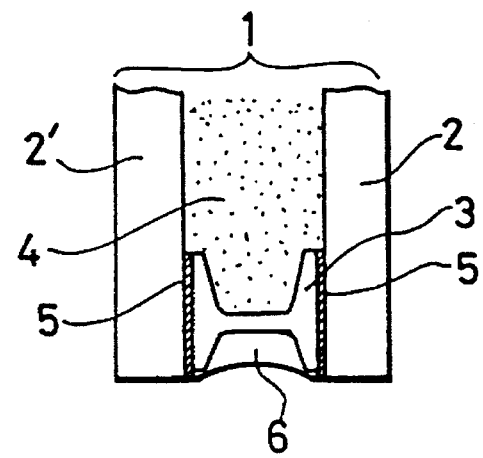

In the fire-resistant glass of FIG. 1A, a spacer 3 is provided slightly inside from the respective ends of plate-shaped vitreous materials 2 and 2'; thereby, a sealing agent 6 is provided in a thick layer and an aqueous gel 4 is sealed sufficiently and undergoes no deterioration in a normal temperature range over a long period of time. The fire-resistant glass of FIG. 1B is a modification of FIG. 1A, wherein the contact area of an adhesive 5 is made large and resultantly the adhesive 5 can respond to the flexion of plate-shaped vitreous materials 2 and 2' and can exhibit its adhesivity sufficiently.

Figure 1C:
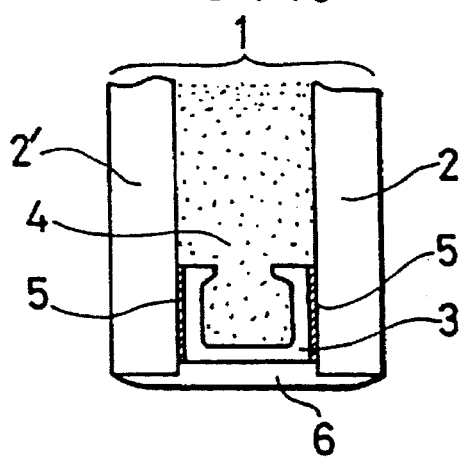
Figure 1D:
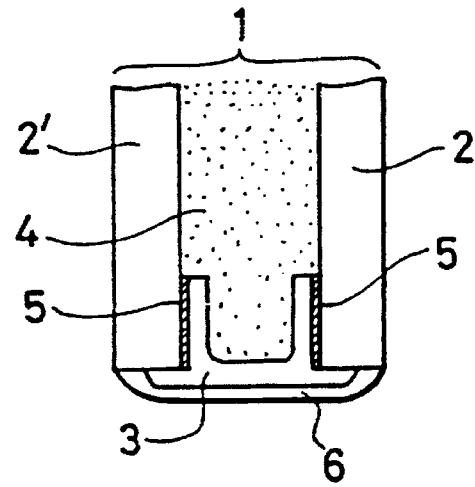

In each of the fire-resistant glasses of FIGS. 1C and 1D, the outer surface of a spacer 3 is made flush with the ends of plate-shaped vitreous materials 2 and 2' and an aqueous gel 4 is filled up to the ends of the plate-shaped vireous materials 2 and 2'; as a result, the fire-resistant glass exhibits heat insulation (prevention of temperature increase) even at the ends of the plate-shaped vitreous materials 2 and 2' and has a high fire-resistant property.

Figure 1E:
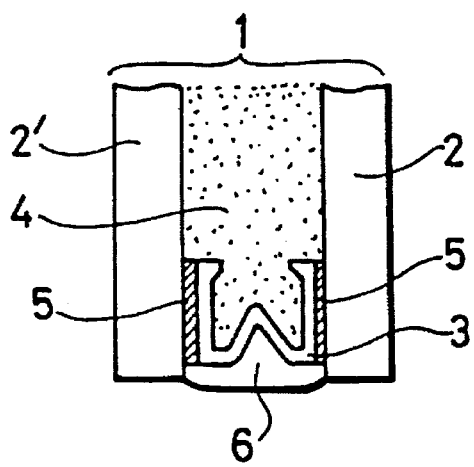

In the fire-resistant glass of FIG. 1E, a spacer 3 is provided in the same manner as in the fire-resistant glasses of FIGS. 1C and 1D but has a linear groove parallel to plate-shaped vitreous materials 2 and 2', at the center of the spacer portion not contacting with the plate-shaped vitreous materials 2 and 2'; as a result, the adhesion of a sealing agent 6 is strong. In the fire-resistant glass of FIG. 1F, plate-shaped vitreous materials 2 and 2' have different sizes and a spacer 3 is contacted even with the end of the plate-shaped vitreous material 2' of smaller size; as a result, the heat-insulating effect of an aqueous gel 4 reaches even said end of the plate-shaped vitreous material 2'.

Figure 1F:
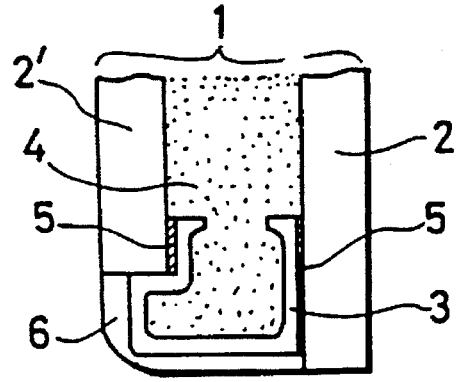

As a modification of the fire-resistant glass of FIG. 1F, a fire-resistant glass (not shown in FIG. 1) is possible in which a spacer is protrudent from the ends of plate-shaped vitreous materials.

The filling of the material composition for aqueous gel is conducted as follows. An injection hole and a degassing hole are made in the spacer, and the material composition for aqueous gel is filled through the injection hole with the atmosphere inside the fire-resistant glass assembly unchanged (air remains unchanged) or preferably changed to an inert atmosphere (e.g. a nitrogen-rich atmosphere or nitrogen gas). The material composition for aqueous gel is preferably subjected beforehand to degassing or the like to remove the oxygen dissolved therein, because the presence of oxygen reduces the polymerization rate of (meth) acrylamide derivative. After the completion of the filling, the two holes are sealed by an appropriate means.

The polymerization of (meth)acrylamide derivative is conducted by applying ultraviolet rays to one side, preferably two sides of the fire-resistant glass assembly. The lamp used for ultraviolet rays application has no particular restriction and there can be used an ordinary mercury lamp, a high-pressure mercury lamp and an ultra-high-pressure mercury lamp. These lamps may be a standard type, an ozone-less type, a metal halide type, a water-cooling type or the like. The required lamp output is 0.1– 500 w/cm$^2$. The required integral exposure is 10–10,000 mJ/cm$^2$, preferably 1,000–9,000 mJ/cm$^2$ in terms of energy amount.

The time of ultraviolet rays application varies depending upon the formulation of material composition for aqueous gel and the intensity of ultraviolet rays and is determined appropriately in view of the intended polymerization degree. It is preferably in the range of several seconds to several tens of minutes.

The thus-obtained fire-resistant glass can prevent spreading-through of flames and has a high heat-insulating effect. That is, when the fire-resistant glass is attacked by flames, the plate-shaped vitreous material in contact with the flames is broken; then, the flames come in contact with the surface of the aqueous gel and the water contained therein is evaporated; the heat of the evaporation hinders temperature increase and the aqueous gel causes whitening and becomes porous, which serves for heat insulation. When the gel is further heated, the organic substances contained therein are decomposed and evaporated and a porous material consisting of a metal oxide remains. This porous material has a heat-insulating property by itself and moreover is heat-resistant (for example, silica is heat-resistant up to temperatures exceeding 1,500° C. and alumina is heat-resistant up to temperatures exceeding 2,000° C.).

The present fire-resistant glass, by controlling the amount of the antifreezing agent used therein, can change from a transparent state to a translucent to opaque state when subjected to a freezing or heating treatment. That is, it can change to a cloudy state.

The glass is in a translucent to opaque state when it has a cloudiness of 10% or more in terms of haze value. Too high a haze value results in loss of translucency. Hence, the haze value is preferably in the range of 10–70%.

The above cloudy fire-resistant glass has features not possessed by transparent glasses, such as privacy protection, soft feeling, decorativeness and the like.

The cloudy fire-resistant glass, as compared with transparent glasses, has high interceptability for sunlight and can reduce the energy required for air cooling. The glass, when heated, is slow in initial temperature rise and can show higher fire preventability.

EXAMPLE 1

10 parts by weight of ethylene glycol, 10 parts by weight of a polyglycerine and 10 parts by weight of lactose were dissolved in 64 parts by weight of an alkaline colloidal silica aqueous suspension (particle diameters of colloidal silica= about 7–9 nm, silica content=about 30% by weight). Thereto were added 2.2 parts by weight of N,N-diethylacrylamide, 3.6 parts by weight of N,N-dimethylacrylamide, 0.2 part by weight of N-isopropylacrylamide and 0.06 part by weight of methylenebisacrylamide. The mixture was stirred to obtain a solution. The solution had a pH of 10.3. Therein was dissolved 0.02 part by weight of 2 -hydroxy-2-methyl-1-phenylpropan-1-one. The solution was degassed under reduced pressure to prepare a material composition for aqueous gel.

Part of the material composition for aqueous gel was sealed in a glass-made test tube in a nitrogen atmosphere and irradiated with ultraviolet rays using a metal halide lamp having an output of 160 w/cm$^2$, to convert the composition into a transparent gel. Then, the test tube containing a transparent gel was immersed in a water bath. The water bath was subjected to temperature elevation to measure a temperature at which the gel caused whitening (a whitening temperature). Incidentally, when the bath temperature was lowered, the whitened gel returned to a transparent gel with said whitening temperature being a transition point.

Separately, there was prepared a fire-resistant glass assembly having a structure as shown in FIG. 1, which comprised a pair of flat soda-lime glasses (produced by float process) each of 600 mm×900 mm×4 mm (thickness) arranged parallel and apart by 16 mm, the sides of the glasses facing each other being treated with a silane coupling agent [γ-(methacryloxypropyl)trimethoxysilane], an aluminum spacer provided between the glasses at their peripheries via a butyl rubber adhesive, and a silicone type sealing agent adhered onto the outer surface of the spacer.

The assembly was filled with the material composition for aqueous gel, stoppered and irradiated with ultraviolet rays using a metal halide lamp having an output of 160 w/cm$^2$ so that the integral exposure became about 4,000 mJ/cm$^2$, to allow the gel to cause polymerization, whereby a fire-resistant glass was obtained.

Figure 2:
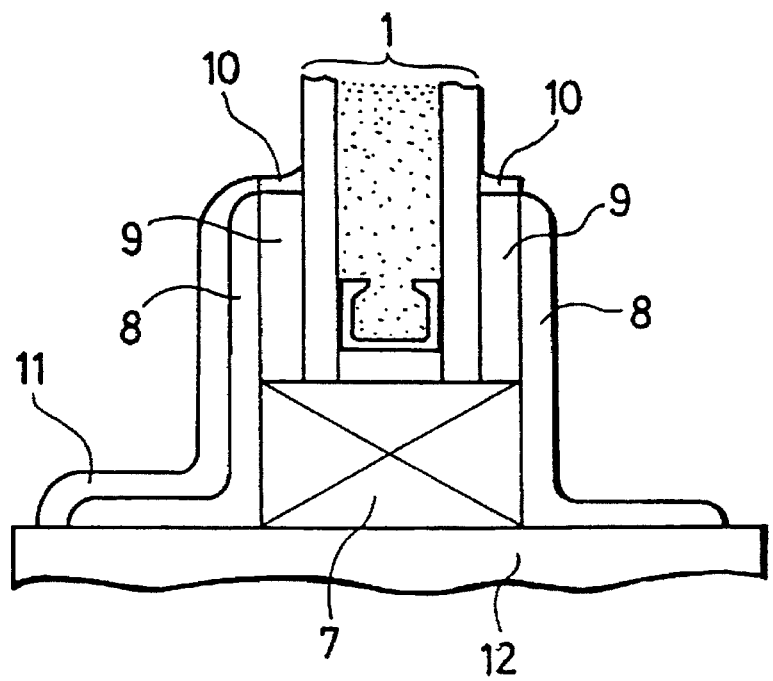
FIG. 2 is a sectional side view showing a state in which a present fire-resistant glass is placed at the opening of a given furnace to conduct a particular fire prevention test.
Figure 3:
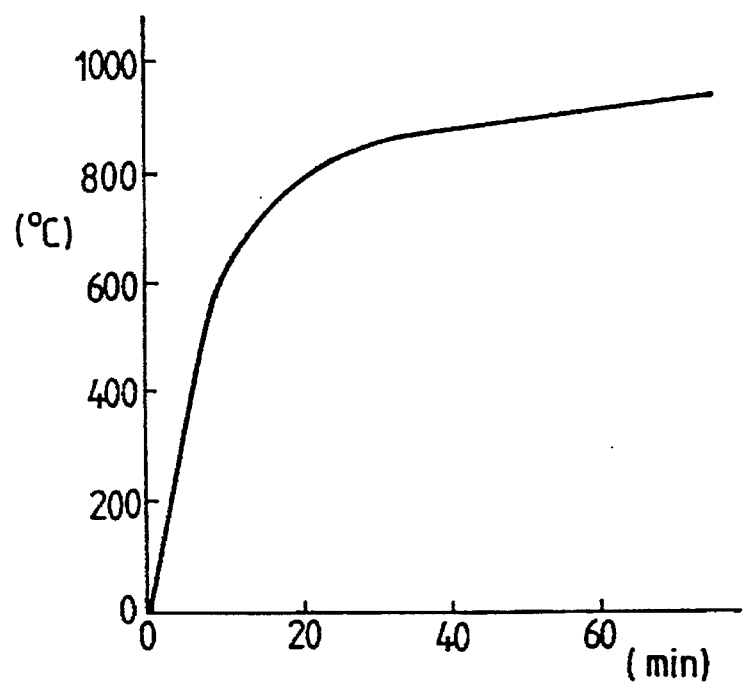
FIG. 3 is a graph showing a temperature (° C.)—hour (min) curve obtained in the fire prevention test.

In accordance with the test method for fire-resistant door, specified by the 1990 notification No. 1125 issued by the Ministry of Construction of Japan, the above-prepared fire-resistant glass was set so as to give a structure shown in FIG. 2, at the opening of a given test furnace and then heated according to a heating curve shown in FIG. 3, to examine the fire-resistant property. In FIG. 2, 1 is a fire-resistant glass; 7 is a setting block consisting of, for example, calcium silicate; 8 and 8 are each a steel-made supporting member; 9 and 9 are each a heat-insulating member consisting of, for example, a ceramic wool or glass wool sheet; 10 and 10 are each a sealing material made of, for example, silicone; 11 is a covering and heat-insulating material consisting of a ceramic wool or glass wool sheet provided inside the furnace; all of them were provided and fixed at the opening end 12 of the test furnace.

When in the above heating test, the fire-resistant glass, after heating to 795° C. in 20 minutes, causes no cracking reaching the back side, no flame spreading to the back side, or no deformation or detaching when subjected to an impact with a 3-kg sand bag under the given conditions, the fire-resistant glass is applicable as an Otsu-grade fire-resistant door (a window, a door or the like of the outer wall of a section of building which may catch fire); and when the fire-resistant glass, after heating to 925° C. in 60 minutes, causes no cracking reaching the back side, no flame spreading to the back side, or no deformation or detaching when subjected to an impact with a 3-kg sand bag under the given conditions, the fire-resistant glass is applicable as a Koh-grade fire-resistant door (a window, a door or the like at the fire-resistant section of building specified by the Fire Services Act). By conducting the above heating test, the fire-resistant glass was examined for applicability as Otsu-grade fire-resistant door (hereinafter referred to simply as Otsu door) as well as for applicability as Koh-grade fire-resistant door (hereinafter referred to simply as Koh door).

The fire-resistant glass was also subjected to a 1,000-hour weathering test using a sunshine wheather-o-meter (WEL-SUN-HMC manufactured by Suga Shikenki K.K., light source=carbon arc), under the conditions of black panel temperature=63°±3° C. and water spraying=12 minutes/60 minutes. After the test, the fire-resistant glass was taken out, returned to normal temperature and observed for appearance.

Further, the fire-resistant glass was set in a thermostat of −20° C., kept therein for 240 hours, taken out and observed for seeing-through property, property change and appearance.

The results of all above are shown in Table 1.

EXAMPLES 2–7

Fire-resistant glasses were prepared in the same manner as in Example 1 with the exception that the material composition for aqueous gel used in Example 1 was changed to those shown in Table 1. The glasses were subjected to the same tests as in Example 1.

Comparative Example 1

Using the same material composition for aqueous gel as in Example 1, a fire-resistant glass was prepared in the same manner as in Example 1 with the exception that the flat glasses were not treated with any silane coupling agent. The glass was subjected to the same tests as in Example 1.

Comparative Example 2

A fire-resistant glass was prepared in the same manner as in Example 1 using a material composition for aqueous gel, of the same component ratio as in Example 1 except that no antifreezing agent was used in the composition of Comparative Example 2. The glass was subjected to the same tests as in Example 1.

Comparative Example 3

A fire-resistant glass was prepared in the same manner as in Example 1 with the exception that the spacer employed had a square-cylinder shape (frequently used in conventional laminated glasses) and no aqueous gel was filled inside the spacer. The glass was subjected to the same tests as in Example 1.

The results of Examples 2–7 and Comparative Examples 1–3 are shown in Table 1.

TABLE 1-1

| | | Example 1 | Example 2 |
|---|---|---|---|
| Composition for aqueous gel | Aqueous medium and particulate metal oxide (parts by weight) | Colloidal silica suspension (64), silica = 30% by weight, particle diameters = 7–9 nm | Colloidal silica suspension (72), silica = 30% by weight, particle diameters = 10–20 nm |
| | (Meth)acrylamide derivative, photo-polymerization initiator, anti-freezing agent, etc. (parts by weight) | N,N-diethylacrylamide (2.2) N,N-dimethylacrylamide (3.6) N-isopropylacrylamide (0.2) Methylenebisacrylamide (0.06) 2-Hydroxy-2-methyl-1-phenyl-propan-1-one (0.02) Ethylene glycol (10) Polyglycerine (10) Lactose (10) | N,N-diethylacrylamide (3.2) N,N-dimethylacrylamide (4.5) Acrylamide (0.3) Methylenebisacrylamide (0.04) 2-Hydroxy-2-methyl-1-phenyl-phenylpropan-1-one (0.02) Polyglycerine (10) Maltose (10) |
| Test results | Remarks Whitening temperature (°C.) Fire prevention test | 90 | 100 |
| | (1) After heating to 795° C. in 20 minutes | None of back side cracking, flame spreading to back side, impact deformation or the like occurred. Applicable as Otsu door. | None of back side cracking, flame spreading to back side, impact deformation or the like occurred. Applicable as Otsu door. |
| | (2) After heating to 925° C. in 60 minutes Weathering test | Same as above. Applicable as Koh door. | Same as above. Applicable as Koh door. |
| | (1) After 800 hours (2) After 1,000 hours | No abnormality was found. Fine foams appeared between the spacer and the gel. The gel caused slight yellowing as a whole. (However, no problem for practical application.) | No abnormality was found. Fine foams appeared between the spacer and the gel. The gel caused slight yellowing as a whole. (However, no problem for practical application.) |
| | 240-Hour storage test at −20° C. | No abnormality was found. | No abnormality was found. |

TABLE 1-2

| | | Example 3 | Example 4 |
|---|---|---|---|
| Composition for aqueous gel | Aqueous medium and particulate metal oxide (parts by weight) | Colloidal silica suspension (71), silica = 30% by weight, particle diameters = 7–9 nm | Colloidal silica suspension (81), silica = 30% by weight, particle diameters = 7–9 nm |
| | (Meth)acrylamide derivative, photo-polymerization | N,N-acryloyl-pyrrolidine (8.1) Acrylamide (0.9) | N,N-acryloyl-piperidine (2.2) N,N-dimethyl- |

TABLE 1-2-continued

|  |  | Example 3 | Example 4 |
|---|---|---|---|
|  | initiator, anti-freezing agent, etc. (parts by weight) | Methylenebis-acrylamide (0.05) 2-Hydroxy-2-methyl-1-phenyl-propane-1-one (0.03) Propylene glycol (10) Urea (10) | acrylamide (6.8) Methylenebis-acrylamide (0.05) 2-Hydroxy-2-methyl-1-phenyl-phenylpropan-1-one (0.03) Propylene glycol (5) Maltose (5) |
| Test results | Remarks Whitening temperature (°C.) Fire prevention test | 60 | 95 |
|  | (1) After heating to 795° C. in 20 minutes | None of back side cracking, flame spreading to back side, impact deformation or the like occurred. Applicable as Otsu door. | None of back side cracking, flame spreading to back side, impact deformation or the like occurred. Applicable as Otsu door. |
|  | (2) After heating to 925° C. in 60 minutes Weathering test | Same as above. Applicable as Koh door. | Same as above. Applicable as Koh door. |
|  | (1) After 800 hours | No abnormality was found. | No abnormality was found. |
|  | (2) After 1,000 hours | Fine foams appeared between the spacer and the gel. The gel caused slight yellowing as a whole. (However, no problem for practical application.) | Fine foams appeared between the spacer and the gel. The gel caused slight yellowing as a whole. (However, no problem for practical application.) |
|  | 240-Hour storage test at −20° C. | No abnormality was found. | No abnormality was found. |

TABLE 1-3

|  |  | Example 5 | Example 6 |
|---|---|---|---|
| Composition for aqueous gel | Aqueous medium and particulate metal oxide (parts by weight) | Colloidal silica suspension (38), silica = 30% by weight, particle diameters = 7–9 nm Colloidal silica suspension (38), silica = 30% by weight, particle diameters = 10–20 nm | Colloidal silica suspension (81), silica = 30% by weight, particle diameters = 7–9 nm Colloidal silica suspension (33), silica = 30% by weight, particle diameters = 10–20 nm |
|  | (Meth)acrylamide derivative, photopolymerization initiator, anti-freezing agent, etc. (parts by weight) | N,N-acryloyl-pyrrolidine (3.7) N,N-diethylacryl-amide (2.1) Acrylamide (3.2) Methylenebisacryl-amide (0.04) 2-Hydroxy-2-methyl-1-phenyl-propan-1-one (0.03) Ethylene glycol (5) Saccharose (5) Urea (5) | N,N-acryloyl-pyrrolidine (6.3) N,N-dimethyl-acrylamide (2.7) Methylenebis-acrylamide (0.04) 2-Hydroxy-2-methyl-1-phenyl-propan-1-one (0.03) Polyglycerine (10) Lactose (10) |

TABLE 1-3-continued

|  |  | Example 5 | Example 6 |
|---|---|---|---|
|  |  |  | N,N-dimethyl-acetamide (5) |
| Test results | Remarks Whitening temperature (°C.) Fire prevention test | 75 | 70 |
|  | (1) After heating to 795° C. in 20 minutes | None of back side cracking, flame spreading to back side, impact deformation or the like occurred. Applicable as Otsu door. | None of back side cracking, flame spreading to back side, impact deformation or the like occurred. Applicable as Otsu door. |
|  | (2) After heating to 925° C. in 60 minutes Weathering test | Same as above. Applicable as Koh door. | Same as above. Applicable as Koh door. |
|  | (1) After 800 hours | No abnormality was found. | No abnormality was found. |
|  | (2) After 1,000 hours | Fine foams appeared between the spacer and the gel. The gel caused slight yellowing as a whole. (However, no problem for practical application.) | Fine foams appeared between the spacer and the gel. The gel caused slight yellowing as a whole. (However, no problem for practical application.) |
|  | 240-Hour storage test at −20° C. | No abnormality was found. | No abnormality was found. |

TABLE 1-4

|  |  | Example 7 | Comparative Example 1 |
|---|---|---|---|
| Composition for aqueous gel | Aqueous medium and particulate metal oxide (parts by weight) | Colloidal silica suspension (71), silica = 30% by weight, particle diameters = 7–9 nm | Colloidal silica suspension (64), silica = 30% by weight, particle diameters = 10–20 nm |
|  | (Meth)acrylamide derivative, photopolymerization initiator, anti-freezing agent, etc. (parts by weight) | N,N-acryloyl-pyrrolidine (6.8) N-acryloylpiperidine (2.2) Methylenebisacryl-amide (0.03) 2-Hydroxy-2-methyl-1-phenyl-propan-1-one (0.03) Propylene glycol (5) Urea (10) | N,N-dimethyl-acrylamide (2.2) N,N-dimethyl-acrylamide (3.6) N-isopropyl-acrylamide (0.2) Methylenebis-acrylamide (0.06) 2-Hydroxy-2-methyl-1-phenyl-propan-1-one (0.02) Ethylene glycol (10) Polyglycerine (10) Lactose (10) No treatment with silane coupling agent |
| Test results | Remarks Whitening temperature (°C.) Fire prevention test | 40 | 90 |
|  | (1) After heating | None of back side | None of back side |

TABLE 1-4-continued

|  | Example 7 | Comparative Example 1 |
|---|---|---|
| to 795° C. in 20 minutes | cracking, flame spreading to back side, impact deformation or the like occurred. Applicable as Otsu door. | cracking, flame spreading to back side, impact deformation or the like occurred. Applicable as Otsu door. |
| (2) After heating to 925° C. in 60 minutes Weathering test | Same as above. Applicable as Koh door. | Same as above. Applicable as Koh door. |
| (1) After 800 hours | The gel caused slight yellowing. (However, no problem for practical application.) | Delamination occurred between the gel and the glass. |
| (2) After 1,000 hours | The gel caused slight yellowing as a whole. (However, no problem for practical application.) | Severe delamination. A large amount of foams appeared between the spacer and the gel. The gel caused slight yellowing as a whole. |
| 240-Hour storage test at −20° C. | No abnormality was found. | Delamination between the gel and the glass. |

TABLE 1-5

|  |  | Comparative Example 2 | Comparative Example 3 |
|---|---|---|---|
| Composition for aqueous gel | Aqueous medium and particulate metal oxide (parts by weight) | Colloidal silica suspension (91), silica = 30% by weight, particle diameters = 7–9 nm | Colloidal silica suspension (64), silica = 30% by weight, particle diameters = 10–20 nm |
|  | (Meth)acrylamide derivative, photopolymerization initiator, antifreezing agent, etc. (parts by weight) | N,N-diethylacrylamide (3.3) N,N-dimethylacrylamide (5.4) N-isopropylacrylamide (0.3) Methylenebisacrylamide (0.06) 2-Hydroxy-2-methyl-1-phenyl-propan-1-one (0.02) | N,N-diethylacrylamide (2.2) N,N-dimethylacrylamide (3.6) N-isopropylacrylamide (0.2) Methylenebisacrylamide (0.06) 2-Hydroxy-2-methyl-1-phenyl-propan-1-one (0.02) Ethylene glycol (10) Polyglycerine (10) Lactose (10) |
|  | Remarks |  | A square-shaped spacer was used. |
| Test results | Whitening temperature (°C.) Fire prevention test | 90 | 90 |
|  | (1) After heating to 795° C. in 20 minutes | None of back side cracking, flame spreading to back side, impact deformation or the like occurred. Applicable as Otsu door. | None of back side cracking, flame spreading to back side, impact deformation or the like occurred. Applicable as Otsu door. |

TABLE 1-5-continued

|  | Comparative Example 2 | Comparative Example 3 |
|---|---|---|
| (2) After heating to 925° C. in 60 minutes Weathering test | Same as above. Applicable as Koh door. | Cracking appeared at the edges. Questionable as to applicability as Koh door. |
| (1) After 800 hours | Slight yellowing appeared at the corner. (However, no problem for practical application.) | No abnormality was found. |
| (2) After 1,000 hours | Fine foams appeared between the spacer and the gel. The gel caused slight yellowing as a whole. (However, no problem for practical application.) | Fine foams appeared between the spacer and the gel. The gel caused slight yellowing as a whole. (However, no problem for practical application.) |
| 240-Hour storage test at −20° C. | The gel froze. | No abnormality was found |

As is clear from Tables 1–5, the fire-resistant glasses of Examples 1–7 have sufficient fire-resistant properties, enabling their application as Koh door, and further have good weatherability and good durability at −20° C. Meanwhile, the fire-resistant glasses of Comparative Examples 1–3 do not satisfy all of the above items. Thus, the fire-resistant glasses of the present invention are superior.

The fire-resistant glass of Example 7, as compared with those of other Examples, shows easier yellowing in the weathering test. Further, the glass has a relatively low whitening temperature; therefore, when used as, for example, a door, a window or the like of a bath room, the glass causes whitening at high temperatures during bathing, reducing the possibility of seeing-through and giving a heat-insulating effect between the inside and outside of the bath room; when used as a window or the like of a building, the glass scatters a sunlight applied directly thereto, serving for heat dissipation. Nevertheless, the glass has limited applications. As to the fire-resistant property, the glass is applicable as Koh door.

In Examples 1–7, the adhesive was changed from the polyisobutylene type adhesive to a butyl rubber type or a polyisobutylene-butyl rubber type and the sealing agent was changed from the silicone rubber type to a polysulfide rubber type, a polyurethane type or a polybutadiene-polystyrene type, and the same good results as above were obtained. Further in Examples 1–7, the distance between the two glasses was changed from 16 mm to 12 mm, and the same good results as above were obtained in the fire prevention test, the weathering test and the −20° C. storage test.

We claim:

1. A process for producing a fire-resistant glass, which comprises arranging at least two plate-shaped vitreous materials parallel and apart, treating the sides of the plate-shaped vitreous materials facing each other with a silane coupling agent, providing a spacer between the plate-shaped vitreous materials at their peripheries via an adhesive, adhering a sealing agent to the exposed outer surface of the spacer to form an assembly, filling, into the space of the assembly formed by the plate-shaped vitreous materials and the spacer, a composition comprising a (meth) acrylamide derivative represented by the following general formula (I) or (II)

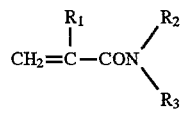 (I)

wherein $R_1$ is a hydrogen atom or a methyl group; $R_2$ is a hydrogen atom, a methyl group or an ethyl group; and $R_3$ is an ethyl group or a propyl group,

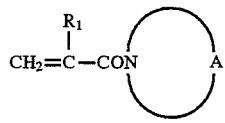 (II)

wherein $R_1$ is a hydrogen atom or a methyl group, and A is $-(CH_2)n\text{-}(\leq n \leq 6)$ or $-(CH_2)_2-O-(CH_2)_2-$, a particulate metal oxide, an aqueous medium and an antifreezing agent, and polymerizing the (meth)acrylamide derivative to convert the composition into an aqueous gel, said gel being transparent at normal temperature and turning white when heated, thereby intercepting heat rays to give excellent fire-resistivity.

2. A process according to claim 1, wherein the polymerization is conducted in the presence of a polymerization initiator selected from the group consisting of an inorganic peroxide, an organic peroxide, a combination of said peroxide and a reducing agent, and an azo compound, or is conducted by application of ultraviolet rays, or by application of ultraviolet rays in the presence of a photopolymerization initiator.

3. A process according to claim 2, wherein the integral exposure of the ultraviolet rays is 10–10,000 mJ/cm$^2$ in terms of energy amount.

* * * * *

UNITED STATES PATENT AND TRADEMARK OFFICE
CERTIFICATE OF CORRECTION

PATENT NO. : 5,653,839
DATED : August 5, 1997
INVENTOR(S) : Hiroshi ITOH, et al.

It is certified that error appears in the above-identified patent and that said Letters Patent is hereby corrected as shown below:

On the title page, item [73], the first assignee's name should be:

--Mitsui Toatsu Chemicals, Incorporated--

Signed and Sealed this

Seventeenth Day of February, 1998

Attest:

BRUCE LEHMAN

*Attesting Officer*   *Commissioner of Patents and Trademarks*